April 15, 1958 J. WENZ 2,830,377
COLLOCATING GAGE FOR CUTTING APPARATUS
Filed May 14, 1954 2 Sheets-Sheet 1

INVENTOR
JOHN WENZ
BY
C. R. Miranda
ATTORNEY

INVENTOR
JOHN WENZ
BY
C. R. Miranda
ATTORNEY

United States Patent Office 2,830,377
Patented Apr. 15, 1958

2,830,377

COLLOCATING GAGE FOR CUTTING APPARATUS

John Wenz, Plainfield, N. J., assignor to Foster Wheeler Corporation, New York, N. Y., a corporation of New York Application May 14, 1954, Serial No. 429,816

7 Claims. (Cl. 33—185)

This invention relates to cutting apparatus and more particularly to cutting apparatus which employs rotary and axially movable cutting tools or drills for forming opening in a work piece.

In cutting or drilling operations, it is customary to spot holes in a desired arrangement or pattern in a work piece before commencing to drill openings in the work. The tool enters the spotted hole and cuts and penetrates through the work piece to form an opening therein. It oftentimes occurs that the operator does not accurately center the tool in the spotted hole and consequently a crooked opening is formed. In work which requires a plurality of closely spaced openings in a relatively thick work piece this presents a serious problem because the openings may meet below the surface of the work piece or the thickness of the metal between adjacent openings may be so little as to render the final work piece useless. Templets have been used with cutting apparatus wherein the templets generally are provided with hardened guide bushings arranged over the particular points in the work piece where openings are to be drilled. Aside from the expense involved in the making of the templets, the cutting tools have been found to be subjected to abnormal strains and stresses which shorten the life of the tools. Furthermore, the use of a templet for only a relatively few work pieces, having the same arrangement of openings to be drilled, becomes prohibitive from an expense standpoint.

The present invention contemplates novel cutting or drilling apparatus whereby a cutting tool may be accurately and positively centered with respect to an opening to be formed in a work piece. In accordance with the present invention, a locating member is used in combination with the cutting apparatus to center the cutting tool with respect to a spotted hole in a work piece. The locating member includes a portion which is adapted for seating in the spotted hole, and a second portion which is adapted for seating in a guide member through which the tool passes.

The particular features and advantages which characterize the present invention will be understood from the following description when considered in connection with the accompanying drawings forming a part thereof and in which:

Fig. 3 is an elevational view of the collar and guide bushing of Fig. 1;

Fig. 4 is a fragmentary sectional view of the cutting apparatus and the locating member taken along the line 4—4 of Fig. 1, particularly showing the locating member seated in the spotted hole and in the guide bushing.

Figure 1:
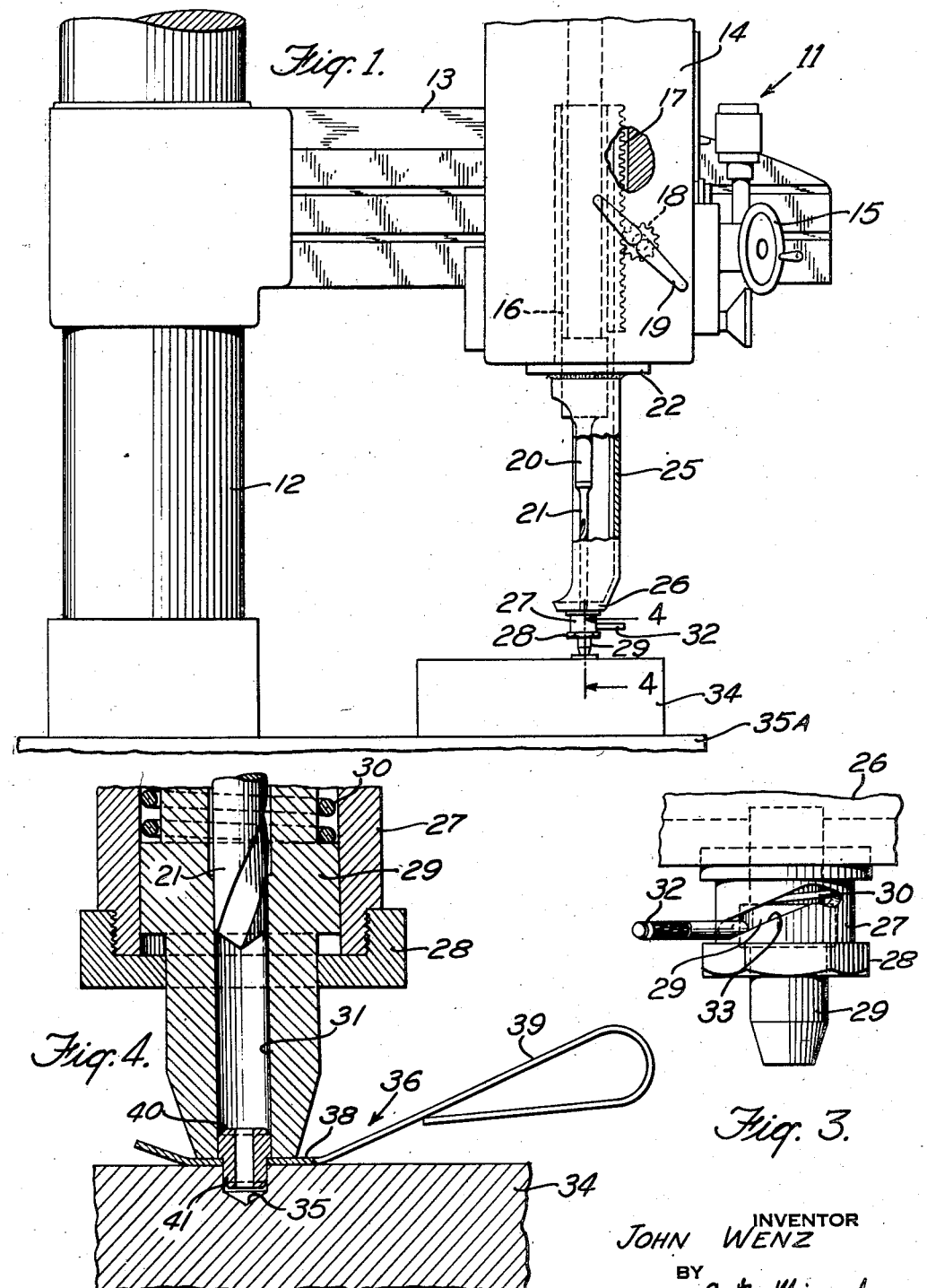
Fig. 1 is a vertical view illustrating, more or less diagrammatically, cutting apparatus embodying the present invention.

Referring now to the drawings for a more detailed description of the present invention and more particularly to Fig. 1 thereof, the numeral 11 designates a cutting apparatus, shown for purposes of illustration as a radial drill type press, which comprises a column or post 12. An arm 13 is pivotally mounted on post 12 and carries a head 14 movable longitudinally of the arm and controlled in its movement by a control wheel 15. Head 14 also is movable vertically by means not appearing in the drawings. Arranged in head 14 is a spindle 16 which is moved axially by a conventional rack 17 and a pinion 18, shown in broken lines in Fig. 1. A pair of handles 19 are disposed on head 14 and effect rotation of pinion 18, either directly by manual drive, or by motor drive (not shown), according to the type of drive desired. A motor (not shown) is positioned in head 14 for rotating spindle 16. Spindle 16 has a tapered opening (Fig. 2) which accommodates one end of a tapered socket member 20 and the two are secured for conjoined movement by a key not shown. A cutting tool 21 is secured for movement with socket member 20 by a threaded bushing 21A. Cutting tool 21 is shown as a twist drill but it must be understood that other types of rotary tools may be employed with the present invention, as for example, gun drills.

Figure 2:
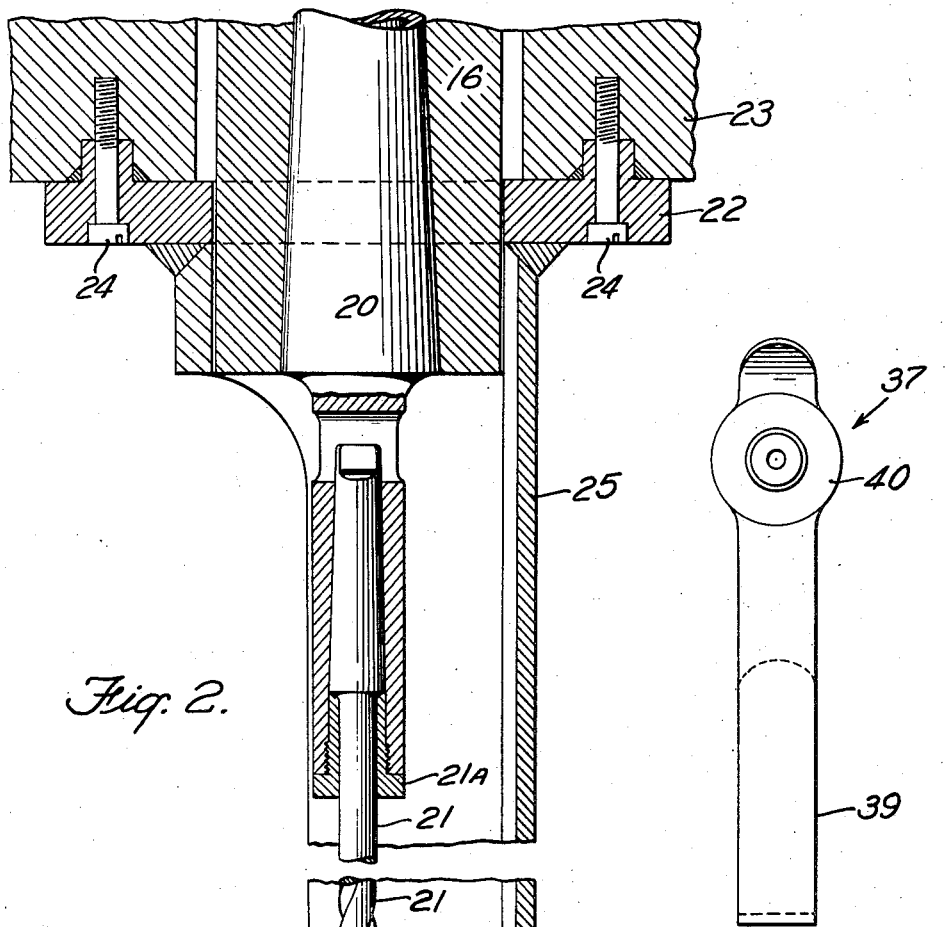
Fig. 2 is an enlarged sectional view of a portion of the cutting apparatus of Fig. 1 together with the locating member of the present invention.
Figure 5:
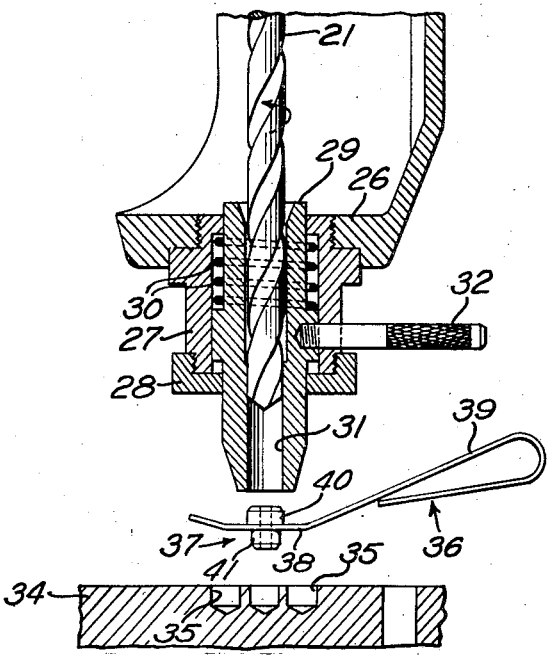
Fig. 5 is an enlarged plan view of the locating member of Fig. 2.

A member 22 is secured to an adaptor 23 on head 14 by threaded members 24. A depending stirrup 25 is fixed to member 22 as by welding and comprising a lower transverse portion 26. Portion 26 has an opening which is arranged concentric with cutting tool 21 and the opening is threaded to cooperate with the threads of a collar 27 (Figs. 2 and 3). Collar 27 is also threaded at a lower portion to accommodate a threaded nut 28. An elongated tool guide bushing 29 is disposed substantially in collar 27 and is resiliently urged downwardly in the bushing by a helical coil spring 30. Guide bushing 29 is free for rotary and axial movement and has an upper portion which protrudes through collar 27 above portion 26 of stirrup 25 and a lower portion which extends through nut 28. A central opening 31 is formed in guide bushing 29 and in alignment with tool 21 to provide for passage of the latter through the guide bushing. A handle 32 is secured to guide bushing 29 at right angles to the latter and the handle is arranged to extend through and ride in a cam-shaped slot 33 (Fig. 3) formed in collar 27. It may be readily seen that movement of handle 32 from the upper portion of slot 33 to the lower portion thereof effects rotary and downward movement of guide bushing 29 in collar 27 while movement of handle 32 in the reverse direction causes upward movement of the guide bushing.

The present invention is directed to the drilling of openings in a work piece having spotted holes. To this end, a work piece 34 is shown in the drawings having counterbored holes 35 and the work piece is arranged on a table 35A (Fig. 1). Generally, in the operation of cutting apparatus of the type disclosed herein, head 14 is moved along arm 13 until the cutting tool is approximately over the spotted hole 35 to be drilled. Spindle 16 and tool 21 are then displaced downwardly toward the hole and if the tool appears to be centered with respect to the spotted hole, the tool is moved into engagement with the work piece to form an opening therein. Oftentimes, due to the human factor the tool is not properly centered and a crooked opening is drilled. The present invention provides means for quickly and accurately centering the tool with respect to the spotted hole and includes a locating member 36. Locating member 36 includes a circular insert or plug 37 mounted on a flat portion 38 and a handle 39 and the plug includes an upper portion 40 and lower portion 41, which lower portion has a diameter smaller than the diameter of the upper portion. The diameter of upper portion 40 is slightly less than the diameter of opening 31 in guide bushing 29 so that the portion 40 may be seated in said opening; the diameter of lower portion 41 is such as to allow it to be seated in a counterbored spotted hole 35.

In operation, work piece 34 is provided with spotted holes 35 in a desired pattern or arrangement by any suitable tool. The work piece is then placed on table 35A and head 14 is moved along arm 13 until tool 21 is over the approximate position of the spotted hole to be drilled. Locating member 36 is then placed on work piece 34 so as to seat lower portion 41 of plug 37 in the designated spotted holes. Head 14 is moved downwardly toward the table and maneuvered until the guide bushing (which is in its up position in collar 27 at this time) is directly over the upper portion 40 of plug 37. When the operator determines that the guide bushing is in proper position, handle 32 is moved in slot 33 to snap the guide bushing downwardly so that the portion 40 of plug 37 seats itself in opening 31 (Fig. 4). Portion 40 has a slightly beveled edge so that if the portion 40 and opening 31 are slightly out of alignment when the bushing 29 descends the latter may be readily brought into alignment with and seated on the portion 40. With the bushing 29 seated on plug 37 the tool is now centered with respect to the spotted hole. Head 14 is locked in position and handle 32 is operated to move guide bushing 29 upwardly to disengage the latter from portion 40. Locating member 36 is removed from the work piece and handle 32 is again operated to move the guide bushing downwardly and adjacent the work piece. Spindle 16 is operated to displace tool 21 through opening 31 in bushing 29 and thence into spotted hole 35 centrally thereof to form an opening in the work piece.

It is now apparent that the present invention provides novel cutting apparatus wherein a cutting tool may be accurately and quickly centered with respect to a spotted hole in a work piece. By utilizing a locating member, as described, the possibility of drilling crooked openings in a work piece is considerably reduced, and minimum time and expense are expended in drilling such openings.

Although one embodiment of the present invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. In combination, a stirrup adapted for mounting on a movable head carrying a rotatable and axially movable cutting tool for cutting in spotted holes in a work piece, a guide member associated with said stirrup for guiding the cutting tool in cutting in a spotted hole, and a locating member for positioning the guide member, said locating member being constructed for seating in the spotted hole to center the cutting tool with respect to the spotted hole and being removable from said spotted hole to allow entry and operation of the cutting tool therein.

2. In combination, a stirrup adapted to be mounted on a movable head carrying a rotatable and axially movable cutting tool for cutting in spotted holes in a work piece, a guide member associated with said stirrup and having an opening for passage of the cutting tool therethrough in cutting in a spotted hole, and a locating member constructed for engagement with the guide member and the spotted hole to position the guide member and center the cutting tool with respect to the spotted hole said locating member further being disengageable from the guide member and removable from the spotted hole to allow entry and operation of the cutting tool therein.

3. In combination, a stirrup adapted to be mounted on a movable head carrying a rotatable and axially movable cutting tool for cutting in spotted holes in a work piece, a guide member carried by said stirrup and having an opening for passage of the cutting tool therethrough in cutting in a spotted hole, and a locating member having a portion adapted for seating in the opening of said guide member and a second portion adapted for seating in the spotted hole to position the guide member and center the cutting tool with respect to the spotted hole said locating member being removable from the guide member and the spotted hole to allow passage of the tool through the guide member and entry and operation of the tool in the spotted hole.

4. In combination, a stirrup adapted to be mounted on a movable head carrying a rotatable and axially movable cutting tool for cutting in spotted holes in a work piece, a guide member carried by said stirrup and having an opening of different diameter than the diameter of the spotted holes, said opening in the guide member being arranged to provide passage of the cutting tool when the latter engages the work to cut in a spotted hole, and a locating member for positioning the guide member and centering the cutting tool with respect to the spotted hole, said locating member comprising a circular plug having a portion for seating in the opening of the guide member and a second portion for seating in the spotted hole.

5. The combination set forth in claim 4 wherein the diameters of the opening in the guide member and of the first mentioned portion of the circular plug are greater than diameters of the spotted hole and the second portion of the circular plug.

6. In combination, a stirrup adapted to be mounted on a movable head carrying a rotatable and axially movable cutting tool for cutting in spotted holes in a work piece, said stirrup being movable by the head to a position adjacent the work piece, a guide member carried by said stirrup and having an opening for passage of the cutting tool therethrough in cutting in a spotted hole, a locating member for positioning the guide member and centering the cutting tool with respect to the spotted hole, said locating member having a portion for seating in the spotted hole and a second portion adapted to face the guide member and for seating in the opening of the latter, and means for moving the guide member relative to the locating member for seating and unseating the guide member on said second portion of the locating member.

7. In combination, a stirrup adapted to be mounted on a movable head carrying a rotatable and axially movable cutting tool for cutting in spotted holes in a work piece, a collar carried by said stirrup and fixed relative thereto, a resiliently urged guide bushing in said collar having an opening for passage of the cutting tool therethrough in cutting in a spotted hole, said guide bushing being rotatable and movable axially in said collar, said collar having a cam-shaped slot formed therein, a handle secured to said guide bushing and extending through the cam-shaped slot in said collar, and a locating member for positioning the guide member and centering the cutting tool with respect to the spotted hole, the locating member having a portion for seating in the spotted hole and a second portion adapted to face the guide member and for seating in the opening of the latter, said handle being operable for moving the guide bushing relative to the stirrup for seating the guide member on said second portion of the locating member.

References Cited in the file of this patent

UNITED STATES PATENTS

| | | |
|---|---|---|
| 93,937 | Wilcox | Aug. 17, 1869 |
| 1,233,458 | Fisk | July 17, 1917 |
| 2,426,124 | Skwierawski | Aug. 19, 1947 |
| 2,479,774 | Pierce | Aug. 23, 1949 |
| 2,539,223 | Bellek | Jan. 23, 1951 |